(12) United States Patent
Chamdani et al.

(10) Patent No.: US 7,194,550 B1
(45) Date of Patent: Mar. 20, 2007

(54) PROVIDING A SINGLE HOP COMMUNICATION PATH BETWEEN A STORAGE DEVICE AND A NETWORK SWITCH

(75) Inventors: Joseph I. Chamdani, Santa Clara, CA (US); Raj Cherabuddi, Cupertino, CA (US); Sudhakar Muddu, Milpitas, CA (US)

(73) Assignee: Sanera Systems, Inc., Sunnyvale, CA (US)

( * ) Notice: Subject to any disclaimer, the term of this patent is extended or adjusted under 35 U.S.C. 154(b) by 777 days.

(21) Appl. No.: 09/944,425

(22) Filed: Aug. 30, 2001

(51) Int. Cl.
*G06F 15/173* (2006.01)
*G06F 15/16* (2006.01)

(52) U.S. Cl. ............. 709/238; 709/227; 709/228; 709/230; 709/250

(58) Field of Classification Search ........ 709/238–244, 709/203, 219, 230–235, 217, 228, 229, 250, 709/227; 370/401, 241, 466, 402, 230, 235, 370/469
See application file for complete search history.

(56) References Cited

U.S. PATENT DOCUMENTS

| | | | |
|---|---|---|---|
| 5,751,710 A * | 5/1998 | Crowther et al. | 370/423 |
| 5,828,905 A * | 10/1998 | Rao | 710/63 |
| 6,000,020 A * | 12/1999 | Chin et al. | 711/162 |
| 6,400,730 B1 * | 6/2002 | Latif et al. | 370/466 |
| 6,535,518 B1 * | 3/2003 | Hu et al. | 370/401 |
| 6,601,101 B1 * | 7/2003 | Lee et al. | 709/227 |
| 6,724,757 B1 * | 4/2004 | Zadikian et al. | 370/388 |
| 6,894,979 B1 * | 5/2005 | Lee | 370/241 |

OTHER PUBLICATIONS

U.S. Appl. No. 09/892,216, Chamdani et al., filed Jun. 25, 2001.
U.S. Appl. No. 09/943,660, Chamdani et al., filed Aug. 30, 2001.
U.S. Appl. No. 09/895,288, Chamdani et al., filed Jun. 29, 2001.
U.S. Appl. No. 09/943,842, Chamdani et al., filed Aug. 30, 2001.
Tanner, Dan, "IP-based storage: The buzz on the wire," InfoStor, <http://is.pennet.com/Articles/Article_Display.cfm?Section=Articles&Subsection=Display&Article_ID=104660&KEYWORD=iscsi>, Jun. 2001.
Clark, Tom, "iSNS: Technical overview of discovery in IP SANs," InfoStor, <http://is.pennet.com/Articles/Articles_Display.cfm?Section=Articles&Subsection=Display&Article_ID=126602&KEYWORD=iscsi>, Nov. 2001.
Ottem, Erik, "SANs for High Availability Systems," Gadzoox Networks whitepaper 2001.
Dot Hill Systems Corp., "SAN Tutorial," (visited Apr. 3, 2001), <http://www.the-storage-in.com/topic01.htm>.

* cited by examiner

*Primary Examiner*—Jeffrey Pwu
(74) *Attorney, Agent, or Firm*—Hensley Kim & Edgington, LLC

(57) ABSTRACT

A unified networking device communicates directly with storage devices and servers in the data center and communicates directly with switches and routers outside of the data center environment. The unified networking device manages data transfers between storage devices, between a storage device and a server, between a storage device and a web switch, and between a storage device and a router. The unified networking device is configured to perform data transfers while bypassing a server. The unified networking device is further configured to perform multi-protocol conversion.

66 Claims, 10 Drawing Sheets

PROVIDING A SINGLE HOP COMMUNICATION PATH BETWEEN A STORAGE DEVICE AND A NETWORK SWITCH

CROSS-REFERENCE TO RELATED APPLICATIONS

This application is related to U.S. patent application Ser. No. 09/943,660, entitled "System and Method for Server Bypassing Using a Unified Networking Device," filed Aug. 30, 2001, and U.S. patent application Ser. No. 09/943,842 entitled "System and Method for Multi-Protocol Conversion Using a Unified Networking Device," filed Aug. 30, 2001. The subject matter of the related applications is incorporated by reference. The related applications are commonly assigned.

FIELD OF THE INVENTION

This invention relates generally to electronic networks and more particularly to a unified networking device configured to enable server bypassing and multi-protocol conversion.

BACKGROUND OF THE INVENTION

Various methodologies have been developed to provide networked storage systems. In Direct Attached Storage (DAS) systems, a server is directly connected to storage devices such that data on the storage devices are only accessible through the one server. A disadvantage of this system is that if the server is malfunctioning or is off-line, data on the storage devices cannot be accessed. In Network Attached Storage (NAS) systems, a server is located on the front-end of a network to assist in file storage, often in addition to a DAS server. The storage availability of an NAS server is independent of the DAS server. Since an NAS server is located on the front-end of a network, it has the disadvantages of sharing the network bandwidth and being affected by increased network traffic and bottlenecks.

FIG. 1 is a block diagram of a prior art embodiment of an electronic network system including a storage area network (SAN) 124. In SAN systems, storage devices 126, 128, 130, 132 are connected to servers 118 through a separate back-end network. SAN 124 typically includes a number of switches connecting multiple servers to multiple storage devices so that each server may access the data on each storage device. Additional storage devices and servers may be accommodated by adding more switches to SAN 124; however, increasing the number of switches in SAN 124 increases the number of hops data must pass through before reaching its destination, which increases latency within SAN 124. A configuration containing tens to hundreds of switches is difficult to manage and troubleshoot. If a fault occurs, technicians may spend hours trying to identify and replace the faulty device.

As shown in FIG. 1, storage devices such as RAID 126 (Redundant Array of Independent Disks) are accessible only through SAN 124 and server 118. During large file transfers, the computing power of server 118 can be tied up performing simple store-and-forward operations while other perhaps more computationally intensive operations must wait. File transfers between storage devices as well as transfers between a storage device and an Internet Protocol (IP) switch 116 must pass through one of the servers.

The servers and various types of storage devices connected by SAN 124 may use several different communication protocols, particularly when new storage devices are added to a legacy storage network. For example, server 118 may communicate using an Ethernet protocol while Just a Bunch of Disks (JBOD) 128 communicates using a Fibre Channel (FC) protocol. Protocol conversions are typically non-trivial operations since many protocols, like IP over Ethernet and Fibre Channel (FC) have no common layers.

SUMMARY OF THE INVENTION

A unified networking device in a data center environment communicates directly with storage devices and servers in the data center and communicates directly with switches and routers outside of the data center environment. The unified networking device manages communications between storage devices, between a storage device and a server, between a storage device and a IP switch, and between a storage device and a router.

The unified networking device comprises sixteen line cards having sixteen ports each so that the unified networking device includes two hundred fifty-six ports. The line cards communicate across a backplane with four switch cards to transfer packets from one port to another. Each line card includes four packet processors configured to process both incoming and outgoing packets for four ports. Each line card also includes four network processing units (NPUs) that perform upper layer processing on incoming and outgoing packets.

Since the unified networking device is able to communicate directly with network devices such as web switches and routers, the unified networking device can bypass servers and perform routine data transfers, such as large file transfer protocol (FTP) file transfers. The NPU of the unified networking device includes a complete Transmission Control Protocol over Internet Protocol (TCP/IP) stack and applications for managing file transfers. Thus, use of the unified networking device unburdens the servers from mundane store-and-forward file transfers so that the servers' resources may be used for other applications.

To enable direct communication with various types of networking devices and storage devices, the unified networking device has a multi-protocol conversion functionality performed by the NPUs of the line cards. If a packet's protocol matches the protocol of its destination port, no conversion is needed. If the packet's protocol does not match the protocol of its destination port, but the two protocols have a common layer, an encapsulation protocol conversion method is used. If the packet's protocol does not match the protocol of its destination port and the two protocols have no common layer but the packet's protocol has a TCP-like functionality, the NPU acts as a TCP-proxy for the destination port. If the packet's protocol does not match the protocol of its destination port and the two packets do not have a common layer and the packet's protocol does not have a TCP-like functionality, then the NPU performs a block storage conversion, reassembling the packets into an information unit and creating new packets according to the destination port's protocol.

DETAILED DESCRIPTION OF THE INVENTION

Figure 2:
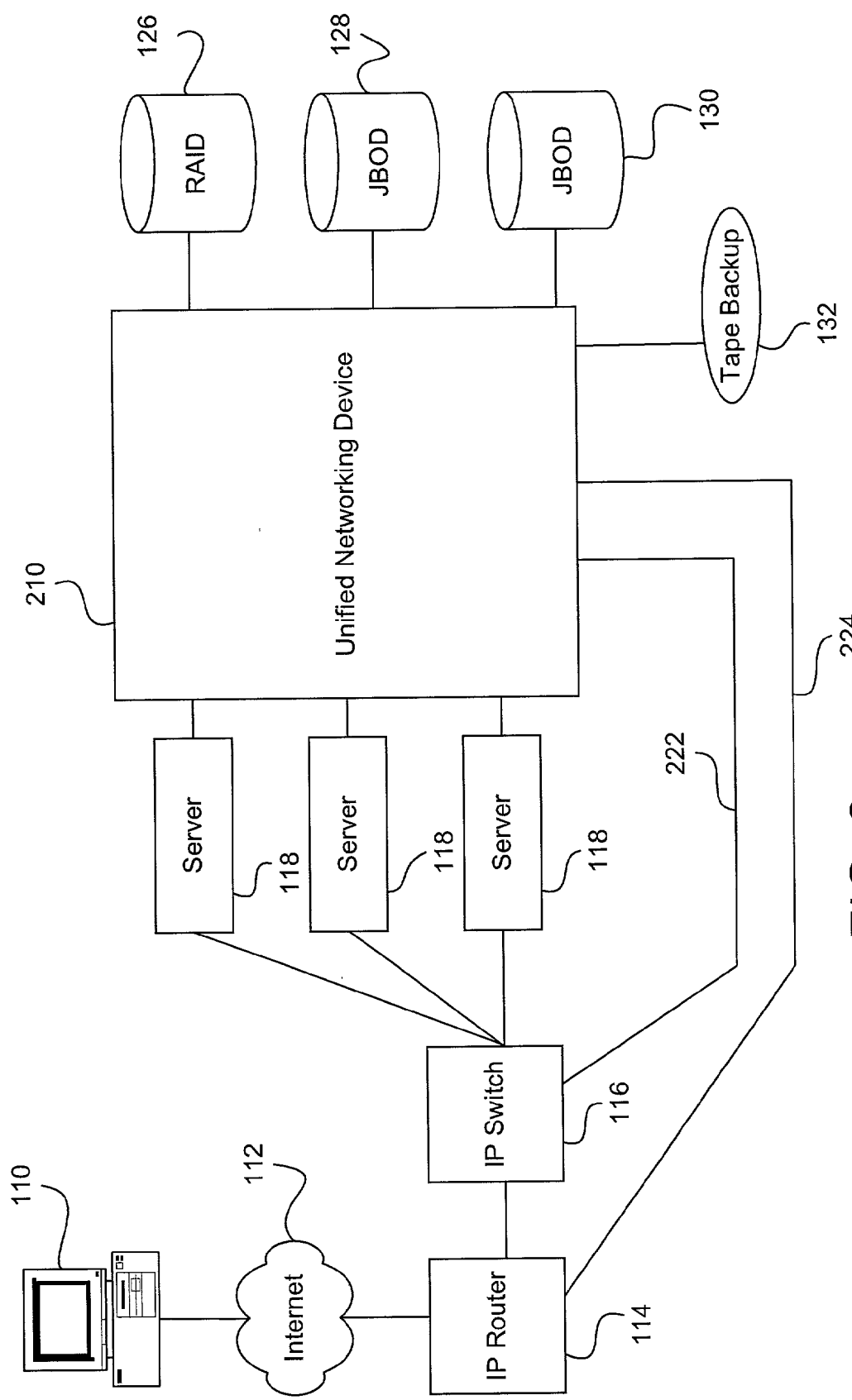
FIG. 2 is a block diagram of one embodiment of an electronic network system including a unified networking device, according to the invention.

FIG. 2 is a block diagram of one embodiment of an electronic network system, according to the invention. An end user 110 communicates via the Internet 112 with an Internet Protocol (IP) router 114. IP router 114 also communicates with an IP switch 116, which in turn communicates with servers 118. Although one tier having three servers 118 is shown in FIG. 2, a network system having any number of tiers with any number of servers is within the scope of the invention. Although an IP router 114 and an IP switch 116 are shown in FIG. 2, any type of network router and any type of network switch are within the scope of the present invention.

The network system of FIG. 2 includes a unified networking device 210 that is configured to communicate with multiple types of devices. Like SAN 124 of FIG. 1, unified networking device 210 communicates with servers 118, RAID 126, JBOD (Just a Bunch of Disks) 128 and 130, and tape backup 132. However, unlike SAN 124, unified networking device 210 communicates directly with IP router 114 via path 224 and with IP switch 116 via path 222. Thus, storage devices such as RAID 126 may communicate via unified networking device 210 with IP switch 116 and IP router 114. Unified networking device 210 provides a single-hop communication path between a storage device and IP switch 116 and between a storage device and IP router 114. A hop refers to a device in a path between two devices in a network, where the number of hops in the path does not include the source device and the receiving device. For example, RAID 126 sends data to unified networking device 210, which sends the data to server 118, which sends the data to IP switch 116. In this example, a path between RAID 126 and server 118 includes one hop (unified networking device 210) and a path between RAID 126 and IP switch 116 includes two hops (unified networking device 210 and server 118). Another path between RAID 126 and IP switch 116 includes one hop (unified networking device 210).

Also, unified networking device 210 allows storage devices such as RAID 126 and JBOD 130 to exchange data without routing the data through a server or other conventional network appliance. In one embodiment, unified networking device 210, RAID 126, JBODs 128 and 130, servers 118, and IP switch 116 form a data center environment, where IP switch 116 is a load balancing network switch that balances network traffic among servers 118. In addition, unified networking device 210 manages communications between server 118 and IP switch 116, and manages communications between server 118 and IP router 114. Thus, unified networking device 210 provides a single-hop communication path between any two devices that are connected to unified networking device 210.

Direct communication between unified networking device 210 and other devices in the network allows unified networking device 210 to off-load some routine tasks, such as large FTP file transfers and remote tape backup, from server 118, which frees up resources at server 118 for processing other applications. This server-bypassing is further discussed below in conjunction with FIGS. 4 & 5.

Communicating with various types of devices requires unified networking device 210 to implement communication protocols appropriate for each device supported, for example Gigabit Ethernet (GigE), Fibre Channel (FC), and InfiniBand (IB). Unified networking device 210 may also need to communicate using Small Computer System Interface (SCSI), Internet Protocol (IP), or other communication protocols. Unified networking device 210 is advantageously configured to perform multi-protocol conversion without assistance from a specialized protocol conversion device. The multi-protocol functionality allows unified networking device 210 to be used with legacy devices as well as newly-developed devices. Multi-protocol conversion as performed by unified networking device 210 is further described below in conjunction with FIGS. 6–8D.

Unified networking device 210 is typically a single unit, unlike the complex network of smaller devices implemented as SAN 124. Implementing unified networking device 210 as a single unit, or rack, simplifies the management of both hardware and software components of unified networking device 210. Unified networking device 210 preferably provides two hundred and fifty six ports operable to communicate with various types of network devices; however, any number of ports is within the scope of the invention. Multiple unified networking device 210 racks can be cascaded together to provide a unified networking device 210 with a larger number of ports. One example of cascading multiple unified networking devices 210 is disclosed in U.S. patent application Ser. No. 09/892,216, entitled "Packet Switching Apparatus Including Cascade Ports and Method for Switching Packets," filed Jun. 25, 2001, the subject matter of which is incorporated by reference.

In one embodiment, unified networking device 210 is configured to manage communications among storage devices, such as RAID 126 and JBOD 130, between storage devices and servers 118, and between storage devices and IP switch 116. In another embodiment, unified networking device 210 is further configured to manage communications between storage devices and IP router 114. In other embodiments, unified networking device 210 is further configured to manage communications between server 118 and IP router 116, and manage communications between server 118 and IP switch 114.

Figure 1:
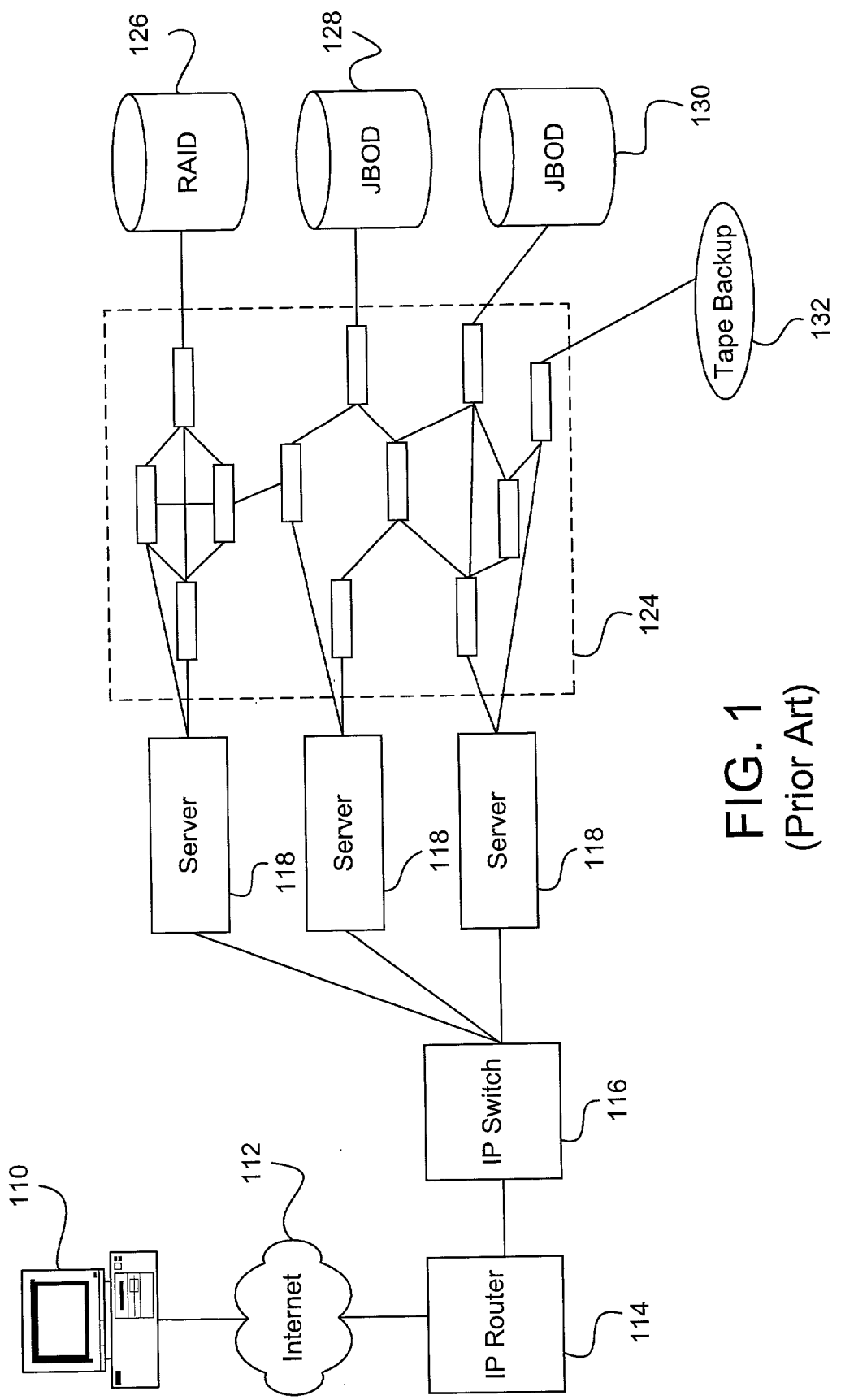
FIG. 1 is a block diagram of a prior art embodiment of an electronic network system.

Unified networking device 210 is simpler to implement than a typical storage area network such as SAN 124 of FIG. 1. Unified networking device 210 is typically implemented as a single device, instead of a multitude of interconnected devices, which reduces the amount of wires or cables in the physical environment. Unified networking device 210 requires fewer physical connections to be maintained by support personnel. Additionally, if errors or faults occur in unified networking device 210, a faulty component may be readily identified and replaced, in contrast to the time and effort required to physically identify and isolate a faulty device in a typical SAN.

Figure 3:
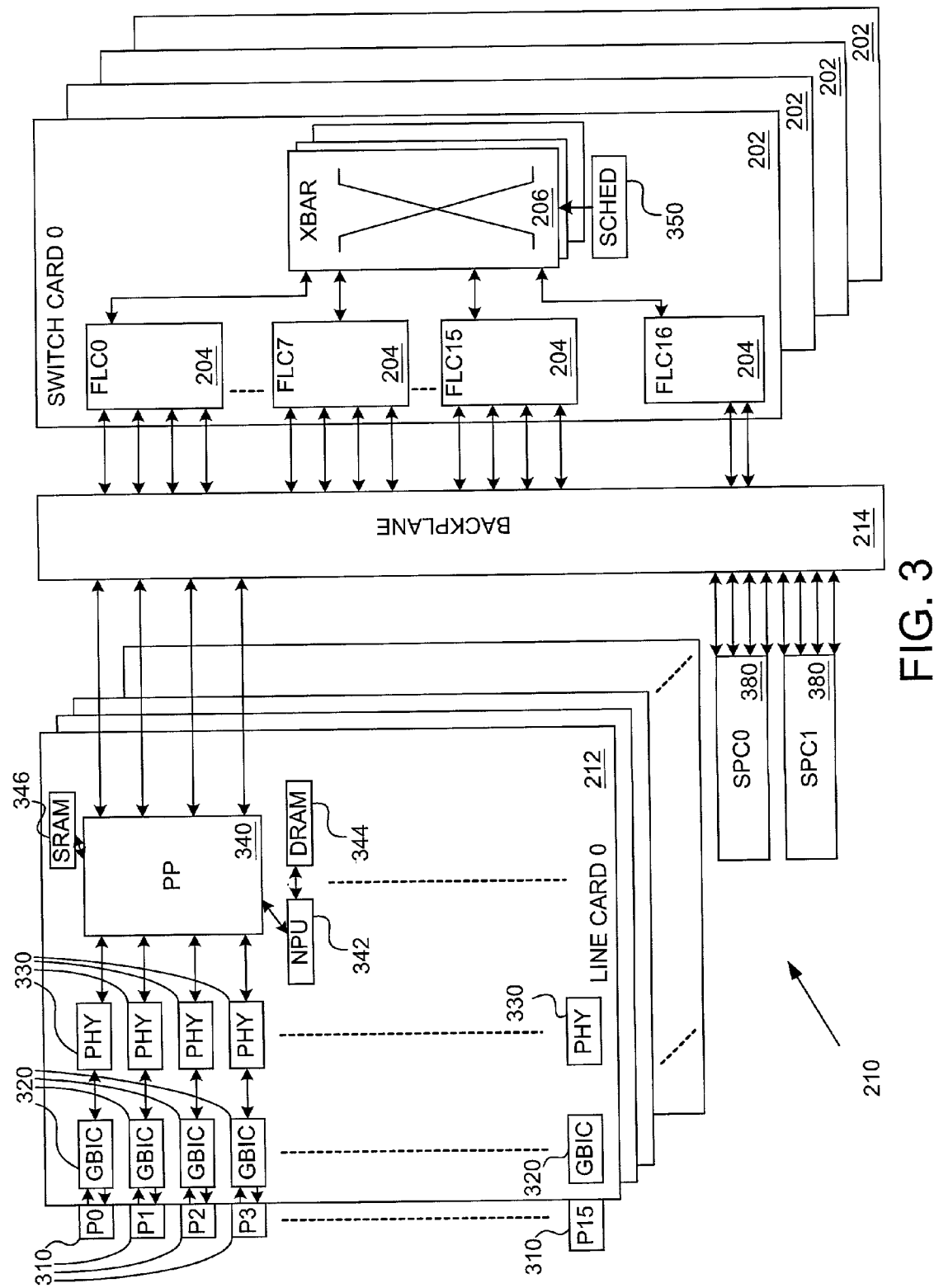
FIG. 3 is block diagram of one embodiment of the unified networking device of FIG. 2, according to the invention.

FIG. 3 is block diagram of one embodiment of the unified networking device of FIG. 2, according to the invention. Unified networking device 210 includes, but is not limited to, four switch cards 202, a passive backplane 214, sixteen line cards including line card 212, and two service processor cards (SPC0 and SPC1) 380. Each line card 212 includes sixteen ports 310, each connected to a corresponding gigabit interface converter (GBIC) 320, which in turn is connected to a corresponding physical layer component (PHY) 330.

Each PHY 330 communicates with a packet processor (PP) 340 that performs layer two (switching) and layer three (routing) processing on incoming and outgoing packets. Each line card 212 includes four packet processors (PP) 340, where each packet processor 340 is an application specific integrated circuit (ASIC) configured to manage packets through four ports on line card 212. Each packet processor 340 is associated with a network processing unit (NPU) 342, a dynamic random access memory (DRAM) 344, and a static random access memory (SRAM) 346. NPU 342, in conjunction with DRAM 344, performs higher layer (layers 3–7) processing on incoming and outgoing packets. SRAM 346 buffers packets being processed by packet processor 340.

Each packet processor 340 is able to simultaneously send four packets or cells across backplane 214 to any of the four switch cards 202. Each switch card 202 includes seventeen flow control ASICs (FLC) 204, sixteen of which communicate with packet processors 340 and one of which communicates with service processor cards 380. FLC 204 is responsible for credit-based flow control queuing between line card 212 and a cross-bar switching fabric (XBAR) 206. In the preferred embodiment, XBAR 206 includes eight cross-bar ASICs. A scheduler 350 receives requests from FLCs 204 and arbitrates access to XBAR 206.

A packet in the form of an optical signal or an electrical signal enters line card 212 at a port 310. GBIC 320 converts the optical or electrical signal into a high-speed serial differential electrical signal. PHY 330 performs physical layer processing on the packet such as framing, clock recovery, and conversion to parallel signals, and then forwards the packet to packet processor 340.

Packet processor 340 internally buffers the packet before performing lower layer (layer two and layer three) processing on the packet's header. Also, the packet's payload is stored in SRAM 346 until the packet is ready to be sent to switch card 202. Lower layer processing includes media access control, header parsing, destination port mapping, packet classification, and error handling. If packet processor 340 determines that the packet requires upper layer processing, then packet processor 340 sends the packet's header and a portion of its payload to NPU 342. Upper layer processing includes the handling of management and control packets and protocol conversion, if needed. Protocol conversion is further discussed below in conjunction with FIGS. 6–8D.

Packet processor 340 segments the packet into cells to reduce memory fragmentation of small packets. Each cell is preferably seventy-two bytes long, including a sixty-four byte payload and an eight byte header created by packet processor 340. When a packet or set of cells is ready to be switched, packet processor 340 arbitrates for a connection through backplane 214 to switch card 202. Once arbitration is complete, packet processor 340 sends the cells across backplane 214 to switch card 202. Packet processor 340 preferably sends cells belonging to the same packet and packets belonging to the same flow (same source, destination, and priority) to the same switch card 202 to maintain cell and packet ordering.

At switch card 202, the cells enter FLC 204, which places each cell into a priority output queue (not shown). FLC 204 sends switch requests to scheduler 350 for a cell at the head of the output queue. Scheduler 350 receives requests from all FLCs 204 on switch card 202, and determines which cells are switched to another FLC 204 during the next switching cycle. Once a switch request is granted, FLC 204 sends the cell to XBAR 206, which switches and sends the cell to a destination FLC 204. The destination FLC 204 arbitrates for a connection through backplane 214 to line card 212. Once arbitration is complete, the destination FLC 204 sends the cell across backplane 214 to a packet processor 340 that services the cell's destination port. Packet processor 340 removes the cell's header and repackages the cell's payload into a packet. PHY 330 processes the repackaged packet, and then GBIC 320 converts the packet to an optical signal or electrical signal and outputs the packet through its destination port 310.

Server bypassing is one functionality of unified networking device 210. Service processor 380 transfers data between storage devices, for example between RAID 126 and JBOD 130 and between JBOD 128 and tape backup 132 (FIG. 2), using the SCSI-3 protocol's third party copy feature. Data transfers between a storage device and end user 110 are discussed below in conjunction with FIGS. 4 & 5.

Figure 4:
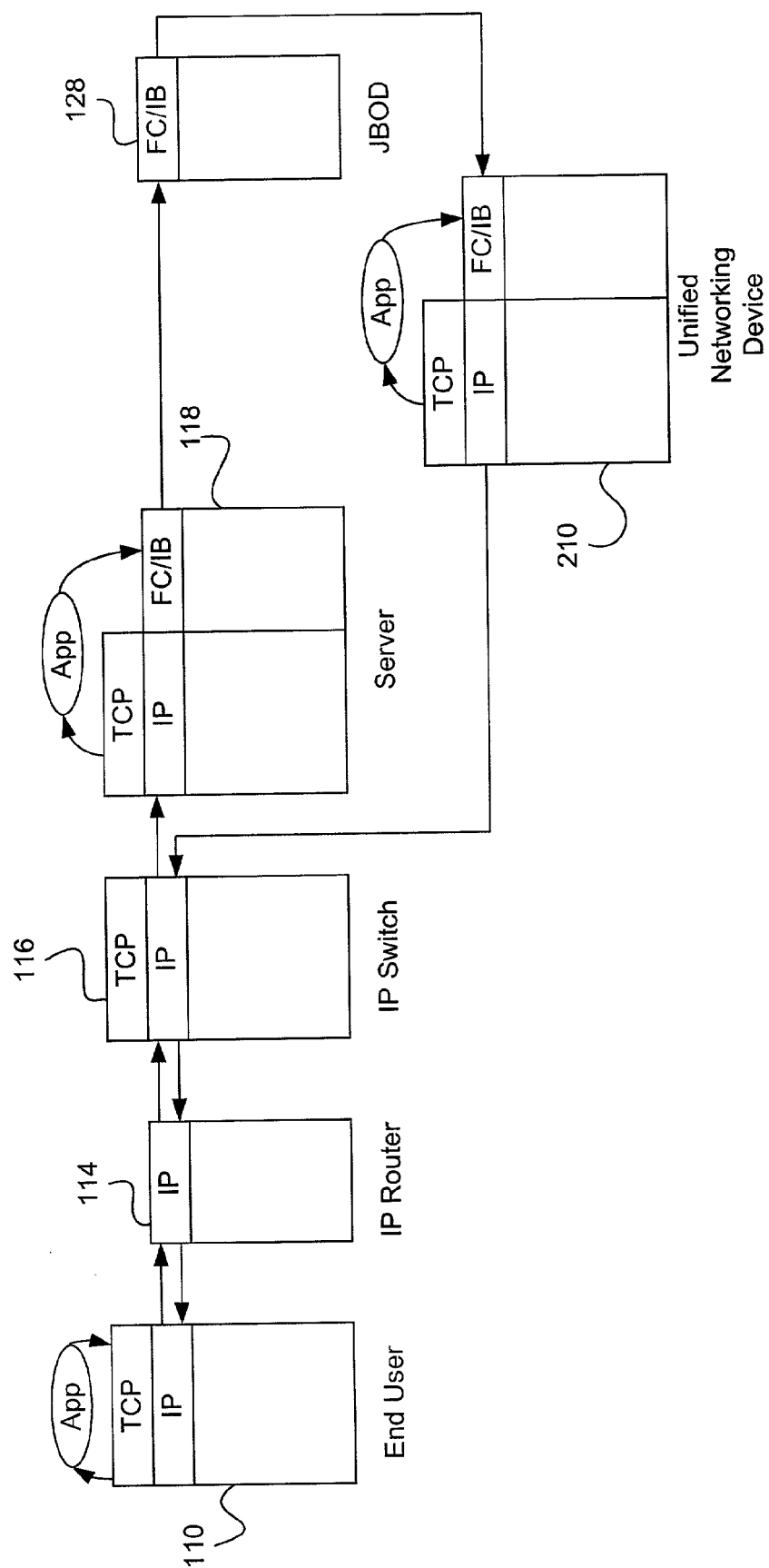
FIG. 4 is a diagram illustrating one embodiment of a data transfer, according to the invention.

FIG. 4 is a diagram illustrating one embodiment of a data transfer between end user 110 and JBOD 128, according to the invention. FIG. 4 shows network layers of the various devices active in the data transfer. An application such as a web browser at end user 110 requests a transfer of data from JBOD 128 using file transfer protocol (FTP). End user 110 establishes a TCP peer-to-peer connection via IP router 114 and IP switch 116 to server 118, according to a TCP three-way handshake. End user 110 sends a SYN message to server 118 to synchronize sequence numbers. Server 118 replies with an ACK message indicating the received sequence number of end user 110 and the sequence number of server 118. End user 110 replies with an ACK message indicating the received sequence number of server 118.

An application running at server 118 receives the FTP request and prepares a request to JBOD 128 in the appropriate protocol, such as FC or IB. In one embodiment, server 118 sends the request directly to JBOD 128, and in another embodiment server 118 sends the request via unified networking device 210 to JBOD 128. Server 118 then instructs unified networking device 210 to retrieve and then deliver the requested file to end user 110. Unified networking device 210 receives the data from JBOD 128 and converts the data into packets of the appropriate protocol, for example Ethernet over IP. The protocol conversion functionality of unified networking device 210 is discussed below in conjunction with FIGS. 6–8D. Unified networking device 210 then sends the data to IP switch 116, which sends the data to IP router 114 and finally to end user 110. The TCP connection between end user 110 and server 118 is then closed.

In the FIG. 4 embodiment, server 118 establishes and maintains a TCP connection with end user 110. Unified networking device 210 performs the actual task of transferring data from JBOD 128 to end user 110. In this embodiment, server 118 is not completely bypassed during the file transfer; however, unified networking device 210 performs the time and resource consuming store-and-forward operations.

Figure 5:
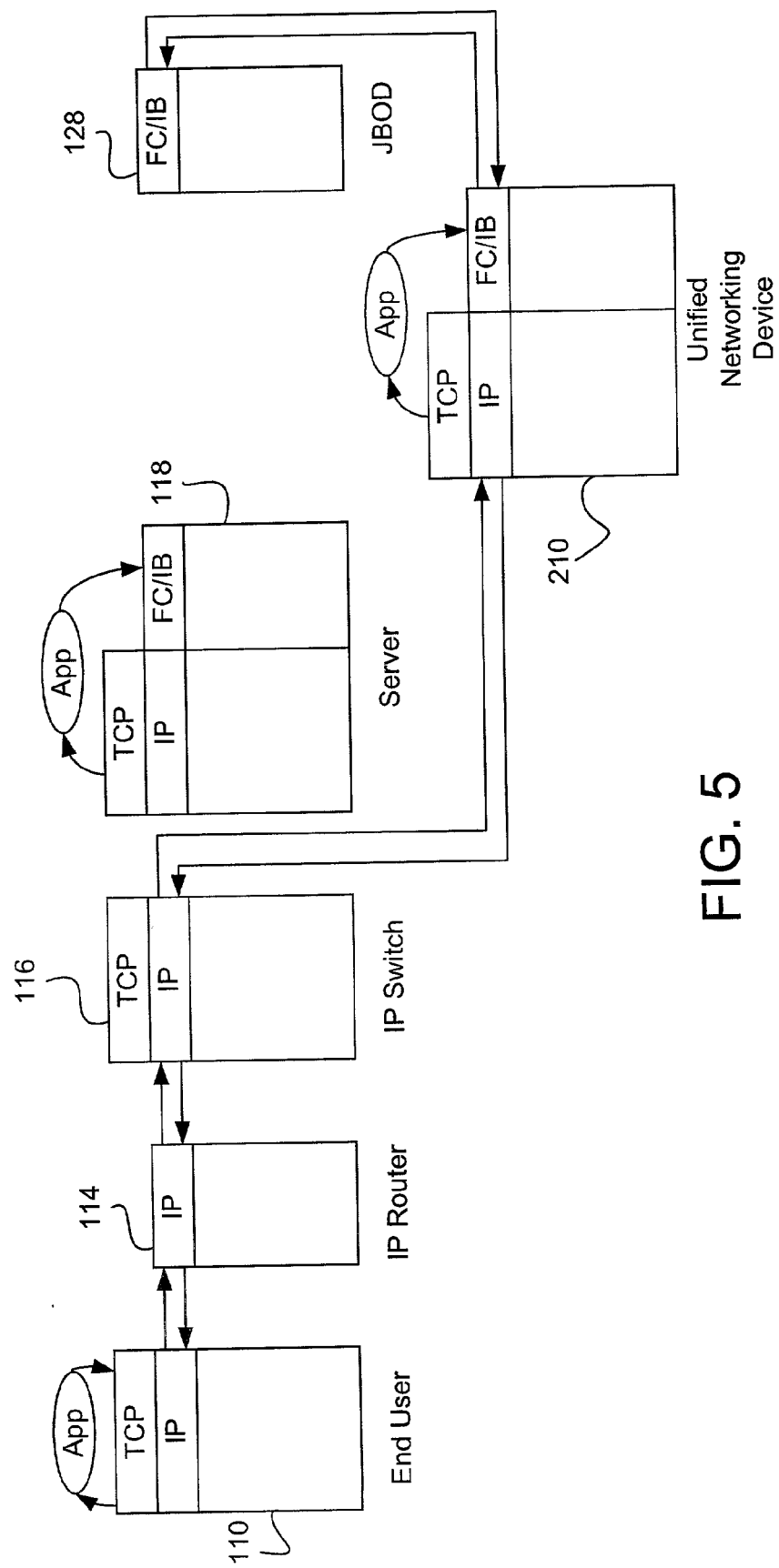
FIG. 5 is a diagram illustrating another embodiment of a data transfer, according to the invention.

FIG. 5 is a diagram illustrating another embodiment of a data transfer from JBOD 128 and end user 110, according to the invention. In this embodiment, server 118 does not establish a TCP connection with end user 110 and is not involved in the transfer of data from JBOD 128 to end user 110. An application such as a web browser at end user 110 requests a transfer of data from JBOD 128 using file transfer protocol (FTP). End user 110 establishes a TCP peer-to-peer connection via IP router 114 and IP switch 116 with unified networking device 210, according to a TCP three-way handshake. End user 110 sends a SYN message to unified networking device 210 to synchronize sequence numbers. Unified networking device 210 replies with an ACK message indicating the received sequence number of end user 110 and the sequence number of unified networking device 210. End user 110 replies with an ACK message indicating the received sequence number of unified networking device 210.

Unified networking device 210 receives the FTP request and prepares a request for a file transfer in an appropriate protocol for JBOD 128, for example FC or IB. The protocol conversion functionality of unified networking device is discussed below in conjunction with FIGS. 6–8D. In response to the request, JBOD 128 begins transferring the file to unified networking device 210, which then forwards the file to IP switch 116 for delivery to IP router 114 and end user 110.

NPU 342 (FIG. 3) of unified networking device 210 includes a complete TCP/IP protocol stack and functionalities that allow unified networking device 210 to perform simple server functions such as FTP file transfers. Unified networking device 210 is a TCP proxy and communicates with server 118 to request certain functionalities like authentication and authorization. Unlike TCP proxies implemented in IP switches, unified networking device 210 does not save packets for retransmission. In case of a failure, for example a lost packet, unified networking device 210 will merely request retransmission from the data source such as JBOD 128.

In an alternate embodiment (not shown), end user 110 establishes a TCP peer-to-peer connection via IP router 114 with unified networking device 210, bypassing IP switch 116. Then unified networking device 210 receives an FTP request from end user 110 and prepares a request for a file transfer in an appropriate protocol for JBOD 128, for example FC or IB. In response to the request, JBOD 128 begins transferring the file to unified networking device 210, which then forwards the file to IP router 114 for delivery to end user 110.

The server bypassing functionality of unified networking device 210 allows the processing power of server 118 to be used for other applications while unified networking device 210 manages file transfers to end user 110 and data backups to tape backup 132. For example, while unified networking device 210 is managing a download of a software application purchased by end user 110, server 118 may be handling other customer transactions such as customer service chat sessions, providing application services, or processing other orders for software. The server bypassing functionality of unified networking device 210 provides additional pathways for data transfers. For example, unified networking device 210 can manage communications between storage devices such as RAID 126 and JBOD 128 and communications between JBOD 130 and IP router 114, while servers 118 manage additional communications with IP switch 116. Thus more communications occur at the same time, allowing the owner of the data being transferred to serve additional numbers of customers or users.

Figure 6:
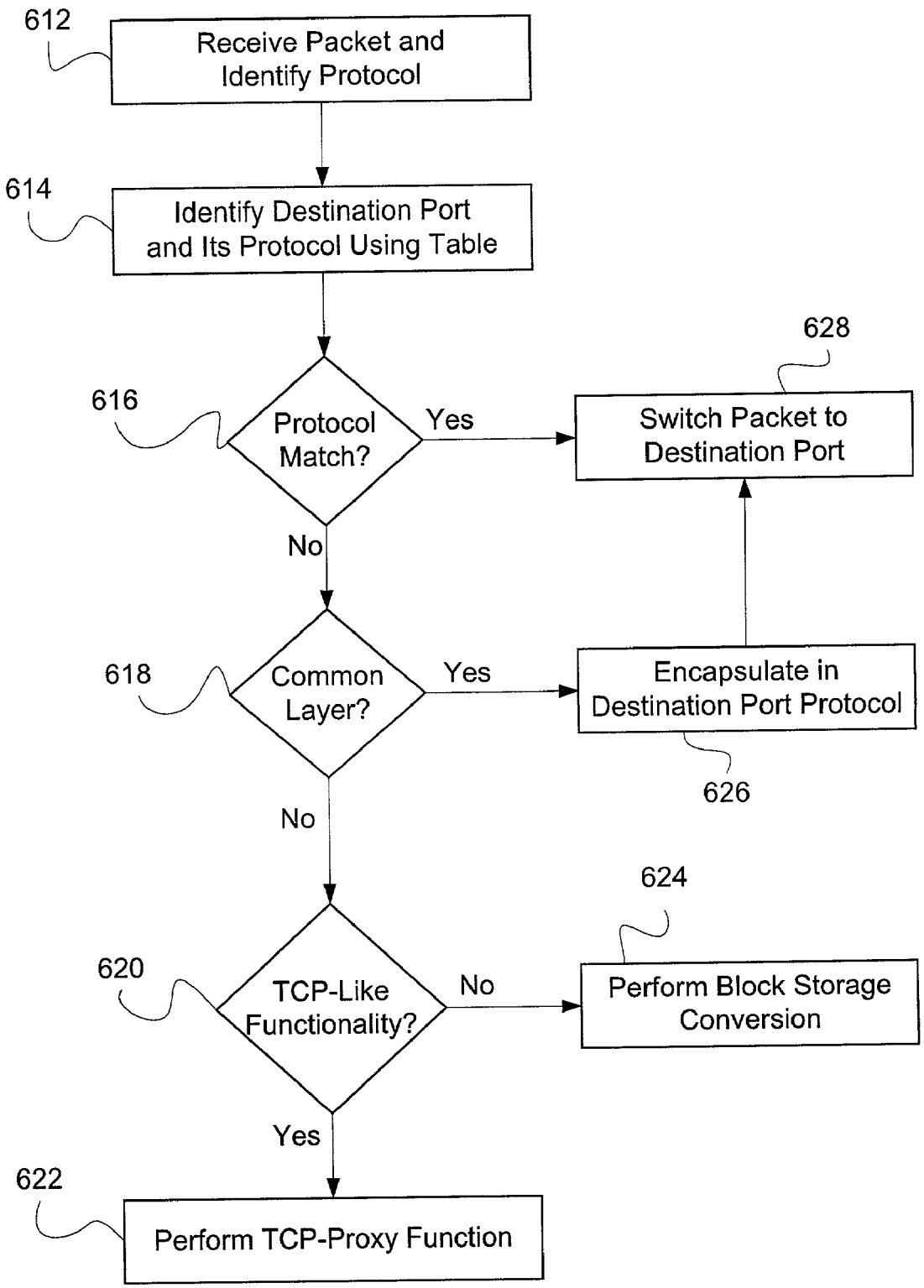
FIG. 6 is a flowchart of method steps for processing packets, according to one embodiment of the invention.

FIG. 6 is a flowchart of method steps for processing packets, according to one embodiment of the invention. In the preferred embodiment, multi-protocol processing occurs after a packet is input to unified networking device 210 and is performed by NPU 342 in line card 212. In step 612, NPU 342 receives an incoming packet and identifies its communication protocol. In step 614, NPU 342 identifies the destination port on unified networking device 210 and then looks up that port's protocol using a table stored in memory. In step 616, NPU 342 determines whether the packet's protocol matches the protocol of the destination port. If the protocols match, the method continues with step 628, where PP 340 sends the packet to switch card 202, which switches the packet to its destination port. If the protocols do not match, the method continues with step 618 where NPU 342 determines if the non-matching protocols have a common layer.

If the non-matching protocols have a common layer, then in step 626 NPU 342 encapsulates the packet in the protocol of the destination port. NPU 342 strips down the packet to the common layer and then builds a new packet around the common layer to match the destination port protocol. The method then continues with step 628, where PP 340 sends the new packet to switch card 202, which switches the new packet to its destination port.

If the non-matching protocols do not have a common layer, then in step 620 NPU 342 determines whether the packet's protocol has a TCP-like functionality. If the packet's protocol does not have a TCP-like functionality, then in step 624 line card 212 performs block storage conversion, which is described below in conjunction with FIGS. 7A–7D. If the packet's protocol has a TCP-like functionality, then in step 622 NPU 342 acts as a TCP-proxy for the destination device, which is described below in conjunction with FIGS. 8A–8D.

Figure 7A:
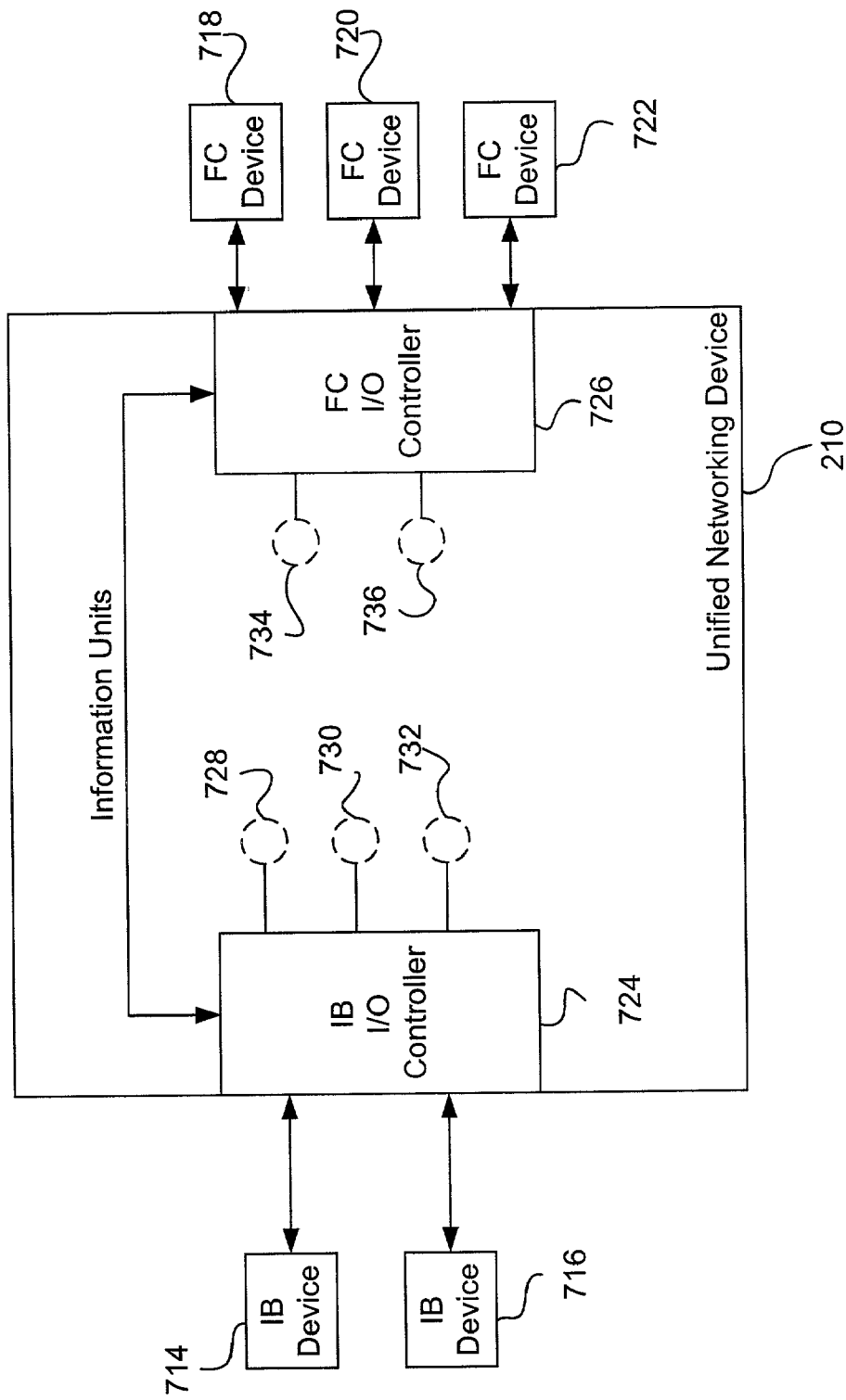
FIG. 7A is a functional block diagram of one embodiment of the block storage conversion functionality of unified networking device 210, according to the invention.

FIG. 7A is a functional block diagram of one embodiment of the block storage conversion functionality of unified networking device 210, according to the invention. As shown in FIG. 7A, unified networking device 210 communicates with two InfiniBand (IB) devices 714 and 716, and three FibreChannel (FC) devices 718, 720, and 722. Although only IB and FC devices are shown in FIG. 7A, unified networking device 210 may be configured to communicate with devices implementing any communication protocol. In the FIG. 7A embodiment, block storage conversion refers to Small Computer System Interface (SCSI) protocol mapping over network protocols such as IB, FC, and IP. Each supported network protocol has an associated adaptation layer used in performing block storage. The IB adaptation layer is SCSI Remote Direct Memory Access protocol (SRP), the FC adaptation layer is FibreChannel Protocol for SCSI (FCP), and the IP adaptation layer is SCSI over IP (iSCSI). In SCSI block storage data is quantized into information units.

In the FIG. 7A embodiment, unified networking device 210 includes, but is not limited to, an IB I/O controller 724 and an FC I/O controller 726. Each I/O controller is a line card 212 where each port 310 is configured to communicate using a specific protocol. In the FIG. 7A embodiment, all ports 310 of IB I/O controller 724 use the IB protocol and all ports of FC I/O controller 726 use the FC protocol; however, in alternative embodiments an I/O controller may include ports 310 using different protocols (e.g., eight ports use IB and eight ports use FC). Although not shown in FIG. 7A, IB I/O controller 724 and FC I/O controller 726 communicate via backplane 214 and switch cards 202. In block storage conversion, each I/O controller (line card 212) strips each received packet down to its payload and reassembles the entire SCSI information unit. Packet processor 340 performs layer two and layer three processing and NPU 342 performs higher layer processing. Each I/O controller re-segments a received information unit into appropriate packets before sending them to the destination device. IB I/O controller 724 and FC I/O controller 726 exchange information units across backplane 214 and switch card 202.

IB I/O controller 724 maintains aliases 728, 730, and 732 for FC devices 718, 720, and 722, respectively. IB I/O controller 724 interacts with IB devices 714 and 716 as if FC devices 718, 720, and 722 were IB devices in communication with IB I/O controller 724. Thus, IB devices 714 and 716 "see" FC devices 718, 720, and 722 as if they were IB devices. IB I/O controller 724 maps aliases 728, 730, and 732 as SRP logical units.

FC I/O controller 726 maintains aliases 734 and 736 for IB devices 714 and 716, respectively. FC I/O controller 726 interacts with FC devices 718, 720, and 722 as if IB devices 714 and 716 were FC devices in communication with FC I/O controller 726. Thus, FC devices 718, 720, and 722 "see" IB devices 714 and 716 as if they were FC devices. FC I/O controller 726 maps aliases 734 and 736 as FCP logical units.

In one example, IB device 714 wants to send data to FC device 722. IB device 714 first sends an SRP request to IB I/O controller 724 addressed to the target device, FC device 722. IB I/O controller 724 receives the SRP request and identifies the destination device and the amount of data to be transferred. In response to the SRP request, IB I/O controller 724 generates a generic command descriptor and sends the descriptor to FC I/O controller 726.

IB device 714 segments an information unit of the data into IB packets and sends the IB packets to IB I/O controller 724, which accumulates the IB packets until the entire information unit has arrived. IB I/O controller 724 then strips the IB packets of their header information and reassembles the information unit. IB I/O controller 724 then segments the information unit into cells and sends the cells via backplane 214 and switch card 202 to FC I/O controller 726.

FC I/O controller 726 receives the cells and reassembles the information unit. FC I/O controller 726 then segments the information unit into FC packets and sends the FC packets to FC device 722. When FC device 722 has received all of the FC packets, FC device 722 sends an FCP response to FC I/O controller 726 to indicate the completed status of the data transfer. FC I/O controller 726 then sends the generic command descriptor back to IB I/O controller 724, which generates an SRP response and sends the SRP response to IB device 714 to indicate that the data transfer is complete.

Figure 7B:
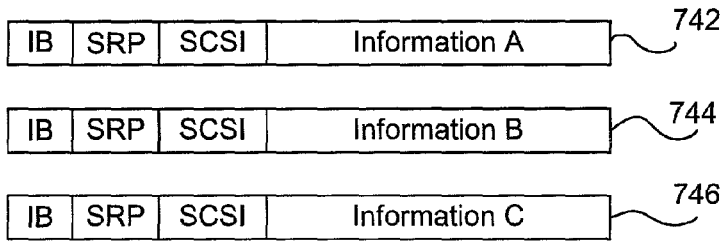
FIGS. 7B–7D illustrate packets containing an information unit.

FIG. 7B illustrates three InfiniBand packets containing segments of an information unit. In the FIG. 7A example, IB device 714 segments an information unit into three parts, information A, information B, and information C. Although three packets are shown in FIG. 7B, an information unit may be packaged in any number of packets. IB device 714 then creates a packet for each information segment. In a first packet 742, information A is preceded by a SCSI header, an SRP header, and an IB header. In a second packet 744, information B is preceded by a SCSI header, an SRP header, and an IB header. In a third packet 746, information C is preceded by a SCSI header, an SRP header, and an IB header.

Figure 7C:
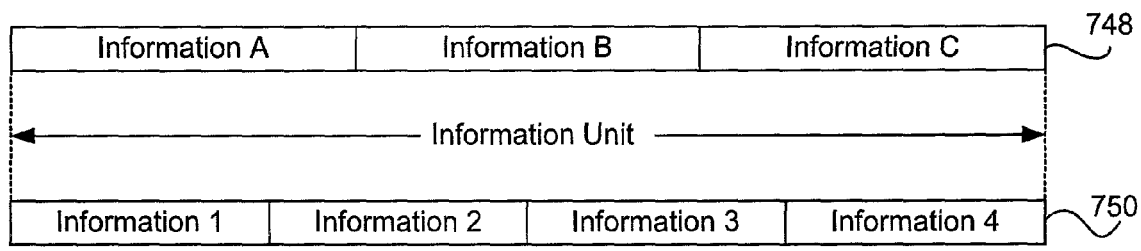

IB device 714 sends packets 742, 744, and 746 to IB I/O controller 724 of unified networking device 210. IB I/O controller 724 strips packets 742, 744, and 746 to their payloads of information A, information B, and information C. Packet processor 340 of IB I/O controller 724 strips the IB and SRP headers from packets 742, 744, and 746, then NPU 342 strips the SCSI header from packets 742, 744, and 746. NPU 342 of IB I/O controller 724 then concatenates the payloads to rebuild the information unit 748, as shown in FIG. 7C. IB I/O controller 724 then sends the information unit to FC I/O controller 726. NPU 342 of FC I/O controller 726 segments the information unit 750 into four segments, as shown in FIG. 7C. Although four segments are shown in FIG. 7C, FC I/O controller 726 may segment the information unit into any number of segments.

Figure 7D:
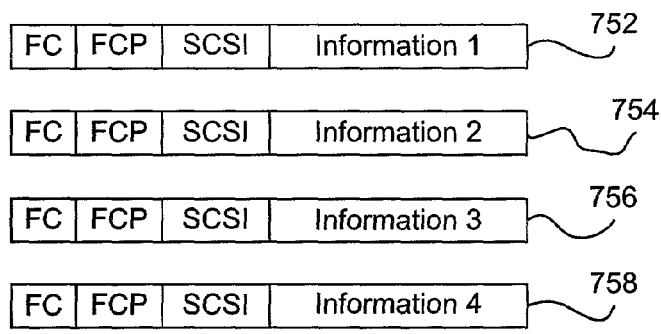

FC I/O controller 726 then builds a packet for each segment of the information unit 750. As shown in FIG. 7D, a first packet 752 includes information 1 preceded by a SCSI header, an FCP header, and an FC header. A second packet 754 includes information 2 preceded by a SCSI header, an FCP header, and an FC header. A third packet 756 includes information 3 preceded by a SCSI header, an FCP header, and an FC header. A fourth packet 758 includes information 4 preceded by a SCSI header, an FCP header, and an FC header. FC I/O controller 726 then sends packets 752, 754, 756, and 758 to FC device 722. NPU 342 of FC I/O controller 726 adds the SCSI header to packets 752, 754, 756, and 758, then packet processor 340 adds the FCP and FC headers to packets 752, 754, 756, and 758.

Figure 8A:
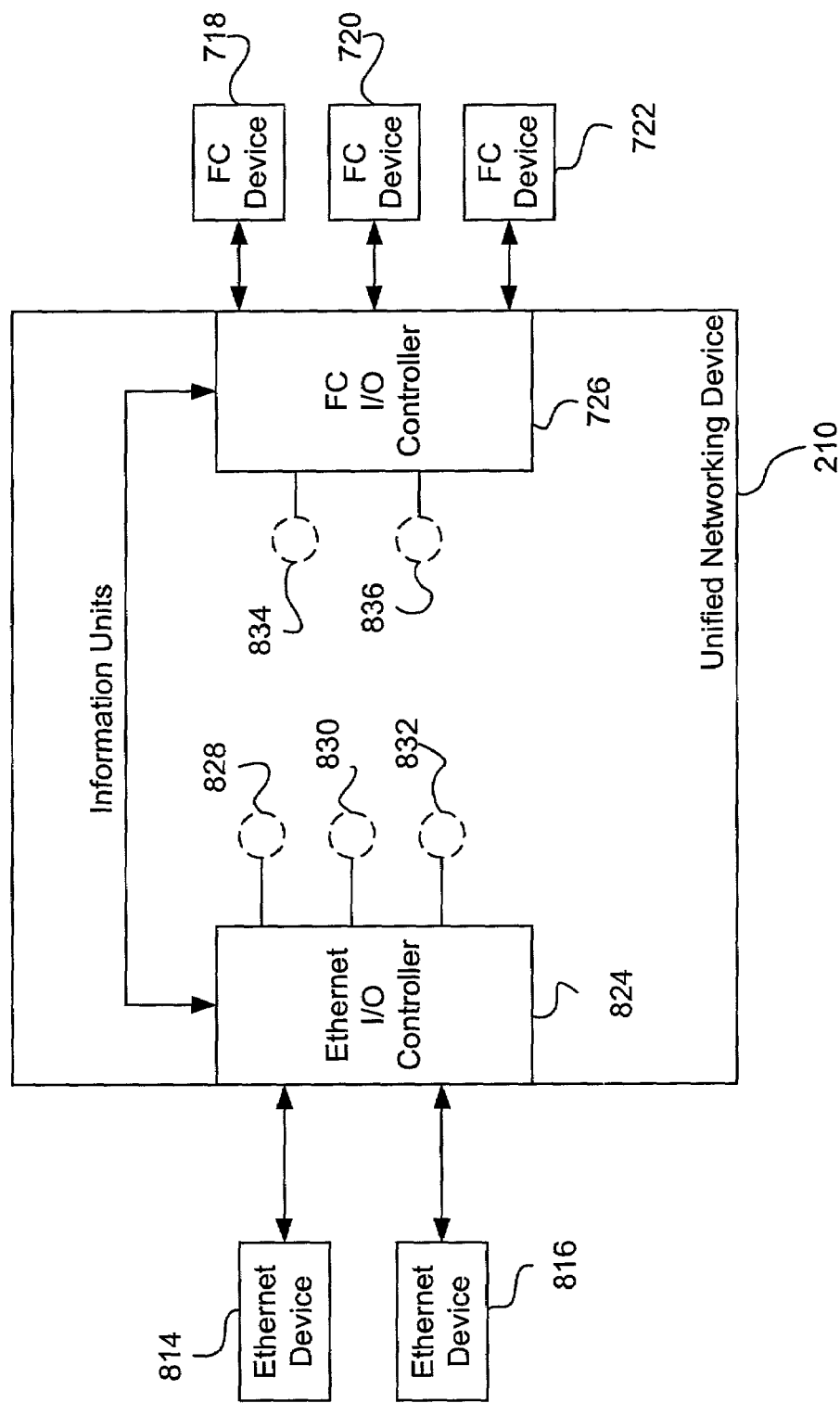
FIG. 8A is a functional block diagram of one embodiment of the TCP-proxy functionality of unified networking device 210, according to the invention.

FIG. 8A is a functional block diagram of one embodiment of the TCP-proxy functionality of unified networking device 210, according to the invention. The TCP-proxy functionality of unified networking device 210 operates when the protocols of the sending device and the destination device do not have a common layer, such as IP, and the sending device formats outgoing data as TCP messages.

In the FIG. 8A embodiment, unified networking device 210 includes, but is not limited to, an Ethernet I/O controller 824 and FC I/O controller 726, which communicate via backplane 214 and switch card 202 (not shown). Each I/O controller is a line card 212 where each port 310 is configured to communicate using a specific protocol. In the FIG. 8A embodiment, all ports 310 of Ethernet I/O controller 824 use the Ethernet protocol and all ports of FC I/O controller 726 use the FC protocol; however, in alternative embodiments an I/O controller may include ports 310 using different protocols (e.g., eight ports use Ethernet and eight ports use FC). Ethernet I/O controller 824 communicates with two Ethernet devices 814 and 816 using Ethernet over TCP/IP packets. Ethernet I/O controller 824 maintains aliases 828, 830, and 832 representing FC devices 718, 720, and 722, respectively. FC I/O controller 726 maintains aliases 834 and 836 representing Ethernet devices 814 and 816, respectively.

In one example, Ethernet device 814 wants to send data to FC device 722. Ethernet device 814 establishes a TCP connection with alias 832 of Ethernet I/O controller 824. Ethernet device 814 then sends Ethernet packets representing a TCP message to Ethernet I/O controller 824. Ethernet I/O controller 824 accumulates the Ethernet packets, discarding the Ethernet, IP, and TCP header information, until the entire TCP message is received. Packet processor 340 of Ethernet I/O controller 824 removes the Ethernet and IP headers and NPU 342 removes the TCP headers. Ethernet I/O controller 824 then segments the message portion of TCP (containing the information unit between initiator and target) into cells and sends the cells via backplane 214 and switch card 202 to FC I/O controller 726. FC I/O controller 726 accumulates the cells until the entire message arrives. FC I/O controller 726 then segments the message into FC packets and sends the FC packets to FC device 722.

Ethernet I/O controller 824 acts as a TCP-proxy for FC devices 718, 720, and 722. Ethernet I/O controller 824 sends acknowledgments for each packet to Ethernet device 814, which interprets the acknowledgments as coming from alias 832 that represents FC device 722. An NPU 342 on Ethernet I/O controller 824 implements a complete TCP/IP protocol stack.

In another example, Ethernet device 816 wants to receive data from FC device 720. Ethernet device 816 sends packets to Ethernet I/O controller 824, performing a TCP "handshake" with alias 830. Ethernet I/O controller 824 generates a generic command descriptor that identifies the requested data and sends the descriptor to FC I/O controller 726. In response to the generic command descriptor, FC I/O controller 726 requests the data from FC device 720, which sees the request as originating from alias 836.

FC device 720 sends FC packets containing the requested data to FC I/O controller 726, which accumulates the packets until the entire requested data is received. FC I/O controller 726 then segments the data into cells and sends the cells to Ethernet I/O controller 824, where the cells are accumulated to form a TCP message. Ethernet I/O controller 824 then segments the TCP message into Ethernet over TCP/IP packets and sends the packets to Ethernet device 816.

Figure 8B:
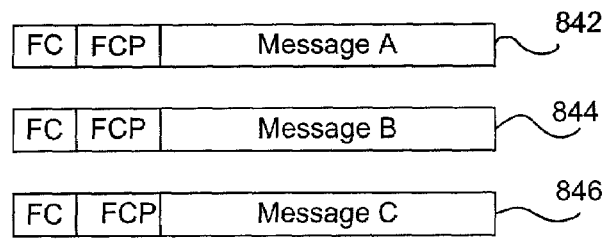
FIGS. 8B–8D illustrate packets containing a message.

FIG. 8B illustrates three FibreChannel packets containing segments of a message. FC device 720 segments the message into three parts, message A, message B, and message C. Although three packets are shown in FIG. 8B, a message may be packaged in any number of packets. A first packet 842 includes message A preceded by an FCP header and an FC header. A second packet 844 includes message B preceded by an FCP header and an FC header. A third packet 846 includes message C preceded by an FCP header and an FC header.

Figure 8C:
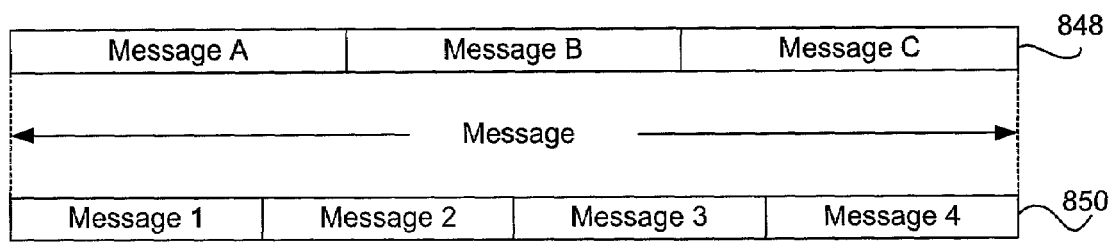
Figure 8D:
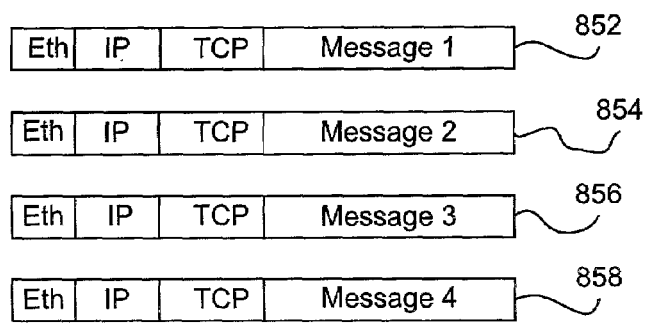

FC device 720 sends packets 842, 844, and 846 to FC I/O controller 726 of unified networking device 210. FC I/O controller 726 strips packets 842, 844, and 846 to their payloads of message A, message B, and message C. Packet processor 340 of FC I/O controller 726 removes the FC header from packets 842, 844, and 846, and NPU 342 removes the FCP header from packets 842, 844, and 846. NPU 342 of FC I/O controller 726 then concatenates message A, message B, and message C to form a complete message 848 as shown in FIG. 8C. FC I/O controller 726 sends the complete message to Ethernet I/O controller 824.

Ethernet I/O controller 824 receives the complete message and segments the message 850 into four parts, as shown in FIG. 8C. Although message 850 has four parts, a message may be segmented into any number of parts. Ethernet I/O controller 824 then creates an Ethernet packet for each message part. A first Ethernet packet 852 includes message 1 preceded by a TCP header, an IP header, and an Ethernet header. A second Ethernet packet 854 includes message 2 preceded by a TCP header, an IP header, and an Ethernet header. A third packet 856 includes message 3 preceded by a TCP header, an IP header, and an Ethernet header. A fourth packet 858 includes message 4 preceded by a TCP header, an IP header, and an Ethernet header. Ethernet I/O controller 824 then sends packets 852, 854, 856, and 858 to Ethernet device 816. NPU 342 of Ethernet I/O controller 824 adds the TCP header to packets 852, 854, 856, and 858, and packet processor 340 add the IP and Ethernet headers to packets 852, 854, 856, and 858.

The multi-protocol conversion functionality of unified networking device 210 provides flexibility in the implementation of a data center. For example, legacy storage devices containing valuable customer data may communicate with newly developed servers or other devices which use a new or different protocol. A user of unified networking device 210 can swap a line card 212 with a new line card 212 configured to implement the protocol of the new device. In an alternate embodiment, an existing line card 212 can be reprogrammed to implement the new protocol, thus requiring no new equipment. A user of unified networking device 210 also has more flexibility in selecting devices to use in the data center. Since unified networking device 210 has the multi-protocol conversion functionality, the user may select the best performing devices for use in the data center without being limited to devices that use one particular protocol. For example, the user may mix and match InfiniBand devices, FibreChannel devices, Ethernet devices, Universal Serial Bus (USB) devices, or any other type of networking devices.

Unified networking device 210 provides a direct, single-hop path between storage devices, between a storage device and a server, between a storage device and a network switch, and between a storage device and a router. Unified networking device 210 also provides a direct, single-hop path between a server and a router, and between a server and a network switch. Unified networking device 210 can be configured to communicate with any type of networking device. By providing these direct pathways between devices, unified networking device 210 allows communications such as data transfers to bypass a server, freeing up server resources that can be allocated to other tasks. Unified networking device 210 also includes a multi-protocol conversion functionality such that the various devices that communicate via unified networking device 210 are not required to use the same communication protocol.

The invention has been described above with reference to specific embodiments. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A network system comprising;
a unified networking device configured to:
provide a single-hop communication path between a storage device and a server, a single-hop communication path between the storage device and a network switch, and a single-hop communication path between the server and the network switch, the unified networking device comprising:
an application specific integrated circuit configured to:
determine that an incoming packet requires protocol conversion; and
send at least a portion of the incoming packet to a network processing unit in response to the determination; and
the network processing unit configured to:
identify a first communication protocol of the incoming packet, the incoming packet destined for a destination port associated with a second communication protocol;
determine if the first communication protocol matches the second communication protocol;
determine if the first communication protocol and the second communication protocol have a common layer if the first communication protocol does not match the second communication protocol; and encapsulate the incoming packet in the second communication protocol if the first communication protocol and the second communication protocol have a common layer.

2. The network system of claim 1, wherein the unified networking device is further configured to provide a single-hop communication path between the storage device and a router, a single-hop communication path between the server and the router, and a single-hop communication path between the network switch and the router.

3. The network system of claim 1, further comprising a second storage device and the unified networking device is further configured to provide a single-hop communication path between the storage device and the second storage device.

4. The network system of claim 1, wherein the network switch is a load-balancing network switch.

5. The network system of claim 1, wherein the storage device is a Redundant Array of Independent Disks (RAID).

6. The network system of claim 1, wherein the storage device is a Just a Bunch of Disks (JBOD).

7. The network system of claim 1, wherein the storage device is a tape drive.

8. The network system claim 1, wherein the unified networking device is configured to communicate with a plurality of servers.

9. The network system of claim 1, wherein the unified networking device includes a plurality of line cards each having at least one port capable of transmitting packets, and a switch card configured to communicate with the plurality of line cards across a backplane.

10. The network system of claim 9, wherein the unified networking device includes sixteen line cards each having sixteen ports, and four switch cards, where each switch card is configured to communicate with every other switch card and each line card.

11. The network system of claim 9, wherein each of the plurality of line cards includes a packet processor in communication with the backplane.

12. The network system of claim 11, wherein each packet processor is an application specific integrated circuit (ASIC).

13. The network system of claim 9, wherein the switch card includes at least one flow control application specific integrated circuit (ASIC) and a crossbar switch.

14. The system of claim 1, wherein the network processing unit is further configured to:
   determine if the first communication protocol and the second communication protocol have TCP-like functionality if the first communication protocol and the second communication protocol have a common layer; and
   perform TCP-proxy function if the incoming packet has TCP-like functionality.

15. The system of claim 1, wherein the network processing unit is further configured to:
   determine if the first communication protocol and the second communication protocol have TCP-like function lity if the first communication protocol and the second communication protocol have a common layer; and
   perform block storage conversion if the incoming packet does not have TCP-like functionality.

16. A network system comprising:
   a unified networking device configured to:
      provide a single-hop communication path between a storage device and a server, a single-hop communication path between the storage device and a router, and a single-hop communication path between the server and the router, the unified networking device comprising:
   an application specific integrated circuit configured to:
      determine that an incoming packet requires protocol conversion; and
      send at least a portion of the incoming packet to a network processing unit in response to the determination; and
   the network processing unit configured to:
      identify a first communication protocol of the incoming packet, the incoming packet destined for a destination port associated with a second communication protocol;
      determine if the first communication protocol matches the second communication protocol;
      determine if the first communication protocol and the second communication protocol have a common layer if the first communication protocol does not match the second communication protocol; and
      encapsulate the incoming packet in the second communication protocol if the first communication protocol and the second communication protocol have a common layer.

17. The system of claim 16, wherein the network processing unit is further configured to:
   determine if the first communication protocol and the second communication protocol have TCP-like functionality if the first communication protocol and the second communication protocol have a common layer; and
   perform TCP-proxy function if the incoming packet has TCP-like functionality.

18. The system of claim 16, wherein the network processing unit is further configured to:
   determine if the first communication protocol and the second communication protocol have TCP-like functionality if the first communication pool and the second communication protocol have a common layer; and
   perform block storage conversion if the incoming packet does not have TCP-like functionality.

19. A network system comprising:
   a unified networking device configured to:
      provide a single-hop communication path between a storage device and a network switch, a single hop communication path between the storage device and a router, and a single-hop communication path between the network switch and the muter, the unified networking device comprising:
   an application specific integrated circuit configured to:
      determine that an incoming packet requires protocol conversion; and
      send at least a portion of the incoming packet to a network processing unit in response to the determination; and
   the network processing unit configured to:
      identify a first communication protocol of the incoming packet, the incoming packet destined for a destination port associated with a second communication protocol;
      determine if the first communication protocol matches the second communication protocol;
      determine if the first communication protocol and the second communication protocol have a common layer if the first communication protocol does not match the second communication protocol; and encapsulate the incoming packet in the second communication protocol if the first communication protocol and the second communication protocol have a common layer.

20. The system of claim 19, wherein the network processing unit is further configured to:
determine if the first communication protocol and the second communication protocol have TCP-like functionality of the first communication protocol and the second communication protocol have a common layer; and
perform TCP-proxy function if the incoming packet has TCP-like functionality.

21. The system of claim 19, wherein the network processing unit is further configured to:
determine if the first communication protocol and the second communication protocol have TCP-like functionality if the first communication protocol and the second communication protocol have a common layer; and
perform block storage conversion if the incoming packet does not have TCP-like functionality.

22. A network system comprising:
a unified networking device configured to:
provide a single-hop communication path between a server and a network switch, a single-hop communication path between the server and a router, and a single-hop communication path between the network switch and the router, the unified networking device comprising:
an application specific integrated circuit configured to;
determine that an incoming packet requires protocol conversion; and
send at least a portion of the incoming packet to a network processing unit in response to the determination; and
the network processing unit configured to:
identify a first communication protocol of the incoming packet, the incoming packet destined for a destination port associated with a second communication protocol;
determine if the first communication protocol matches the second communication protocol;
determine if the first communication protocol and the second communication protocol have a common layer if the first communication protocol does not match the second communication protocol; and
encapsulate the incoming packet in the second communication protocol if the first communication protocol and the second communication protocol have a common layer.

23. The system of claim 22, wherein the network processing unit is further configured to:
determine if the first communication protocol and the second communication protocol have TCP-like functionality if the first communication protocol and the second communication protocol have a common layer; and
perform TCP-proxy function if the incoming packet has TCP-like functionality.

24. The system of claim 22, wherein the network processing unit is further configured to:
determine if the first communication protocol and the second communication protocol have TCP-like functionality if the first communication protocol and the second communication protocol have a common layer; and perform block storage conversion if the incoming packet does not have TCP-like functionality.

25. A method for system networking, comprising the steps of:
providing a single-hop communication path between at least two storage devices using a unified networking device;
providing a single-hop communication path between a storage device and a server using the unified networking device;
providing a single-hop communication path between a storage device and a network switch using the unified networking device;
determining at an application specific integrated circuit that an incoming packet requires protocol conversion, the unified networking device comprising the application specific integrated circuit;
sending at least a portion of the incoming packet from the application specific integrated circuit to a network processing unit in response to the determination, the unified networking device comprising the network processing unit;
identifying at the network processing unit a first communication protocol of the incoming packet, the incoming packet destined for a destination port associated with a second communication protocol;
determining if the first communication protocol matches the second communication protocol;
determining if the first communication protocol and the second communication protocol have a common layer if the first communication protocol does not match the second communication protocol; and
encapsulating the incoming packet in the second communication protocol if the first communication protocol and the second communication protocol have a common layer.

26. The method of claim 25, further comprising the step of providing a single-hop communication path between a storage device and a router using the unified networking device.

27. The method of claim 25, further comprising the step of providing a single-hop communication path between the server and the network switch using the unified networking device.

28. The method of claim 25, further comprising the step of providing a single-hop communication path between the server and a router using the unified networking device.

29. The method of claim 25, wherein the network switch is a load balancing network switch.

30. The method of claim 25, wherein the plurality of storage devices includes a Redundant Array of Independent Disks (RAID).

31. The method of claim 25, wherein the plurality of storage devices includes a Just a Bunch of Disks (JBOD).

32. The method of claim 25, wherein the plurality of storage devices includes a tape drive.

33. The method of claim 25, wherein each single-hop communication path is configured to carry data packets.

34. The method of claim 25, further comprising the steps of:
determining if the first communication protocol and the second communication protocol have TCP-like functionality if the first communication protocol and the second communication protocol have a common layer; and
performing TOP-proxy function if the incoming packet has TCP-like functionality.

35. The method of claim 25, further comprising the steps of:
 determining if the first communication protocol and the second communication protocol have TCP-like functionality if the first communication protocol and the second communication protocol ha ve a common layer; and
 performing block storage conversion if the incoming packet does not have TCP-like functionality.

36. A system for managing communications in a network comprising:
 means for providing a single-hop communication path among a plurality of storage devices, providing a single-hop communication path between one of the plurality of storage devices and a server, and providing a single-hop communication path between one of the plurality of storage devices and a network switch;
 means for determining at an application specific integrated circuit that an incoming packet requires protocol conversion;
 means for sending at least a portion of the incoming packet from the application specific integrated circuit to a network processing unit in response to the determination;
 means for identifying at the network processing unit a first communication protocol of the incoming packet, the incoming packet destined for a destination port associated with a second communication protocol;
 means for determining if the first communication protocol matches the second communication protocol;
 means for determining if the first communication protocol and the second communication protocol have a common layer if the first communication protocol does not match the second communication protocol; and
 means for encapsulating the incoming packet in the second communication protocol if the first communication protocol and the second communication protocol have a common layer.

37. The system of claim 36, wherein the means for providing single-hop communication paths provides a single-hop communication path between one of the plurality of storage devices and a router.

38. The system of claim 36, wherein the means for providing single-hop communication paths provides a single-hop communication path between the server and the network switch.

39. The system of claim 36, wherein the means for providing single-hop communication paths provides a single-hop communication path between the server and a router.

40. The system of claim 36, further comprising:
 means for determining if the first communication protocol and the second communication protocol have TCP-like functionality if the first communication protocol and the second communication protocol have a common layer; and
 means for performing TCP-proxy function if the incoming packet has TCP-like functionality.

41. The system of claim 36, further comprising:
 means for determining if the first communication protocol and the second communication protocol have TCP-like functionality if the first communication protocol and the second communication protocol have a common layer; and
 means for performing block storage conversion if the incoming packet does not have TCP-like functionality.

42. A unified networking device comprising:
 a line card including a plurality of ports, at least one of the plurality of ports being configured to communicate with a storage device, at least one of the plurality of ports being configured to communicate with a server, and at least one of the plurality of ports being configured to communicate with a network switch; and
 a switch card configured to switch data packets and to communicate with the line card through a backplane;
 an application specific integrated circuit configured to:
  determine that an incoming packet requires protocol conversion; and
  send at least a portion of the incoming packet to a network processing unit in response to the determination; and
 the network processing unit configured to:
  receive the data packets from the line card, the data packets comprising an incoming packet;
  identify a first communication protocol of the incoming packet, the incoming packet destined for a destination port associated with a second communication protocol;
  determine if the first communication protocol matches the second communication protocol;
  determine if the first communication on protocol and the second communication protocol have a common layer if the first communication protocol does not match the second communication protocol; and
  encapsulate the incoming packet in the second communication protocol if the first communication protocol and the second communication protocol have a common layer.

43. The unified networking de ice of claim 42, wherein at least one of the plurality of ports is configured to communicate with a router.

44. The unified networking device of claim 43, wherein one of the plurality of ports of the line card is configured to receive packets from the storage device, the line card is configured to send the packets via the backplane to the switch card, the switch card is configured to switch the packets via the backplane to the line card, and another one of the plurality of ports of the line card is configured to send the packets to the router.

45. The unified networking device of claim 42 further comprising sixteen line cards and four switch cards.

46. The unified networking device of claim 45, wherein each of the sixteen line cards includes sixteen ports.

47. The unified networking de ice of claim 45, wherein each of the four switch cards includes at least one flow control application specific integrated circuits (ASICs) and a cross bar switch.

48. The unified networking device of claim 42, wherein the storage device is a Redundant Array of Independent Disks (RAID).

49. The unified networking device of claim 42, wherein the storage device is a Just a Bunch of Disks (JBOD).

50. The unified networking device of claim 42, wherein the storage device is a tape drive.

51. The unified networking device of claim 42, wherein the line card includes et least one packet processor in communication with the backplane.

52. The unified networking de vice of claim 51, wherein the at least one packet processor is an application specific integrated circuit (ASIC).

53. The unified networking de ice of claim 42, wherein each of the plurality of ports is configured to send and receive packets.

54. The unified networking device of claim 42, wherein one of the plurality of ports of the line card is configured to receive packets from the storage device, the line card is configured to send the packets via the backplane to the switch card, the switch card is configured to switch the packets via the backplane to the line card, and another one of the plurality of port of the line card is configured to send the packets to the network switch.

55. The unified networking device of claim 42, wherein one of the plurality of ports of the line card is configured to receive packets from the storage device, the line card is configured to send the packets via the backplane to the switch card, the switch card is configured to switch the packets via the backplane to the line card, and another one of the plurality of ports of the line card is configured to send the packets to a tape drive.

56. The device of claim 42, wherein the network processing unit is further configured to;
  determine if the first communication protocol and the second communication protocol have TCP-like functionality if the first communication protocol and the second communication protocol have a common layer; and
  perform TCP-proxy function if the incoming packet has TCP-like functionality.

57. The device of claim 42, wherein the network processing unit is further configured to:
  determine if the first communication protocol and the second communication protocol have TCP-like functionality if the first communication protocol and the second communication protocol have a common layer; and
  perform block storage conversion if the incoming packet does not have TCP-like functionality.

58. A unified networking device comprising:
  a line card including a plurality of ports, at least one of the plurality of ports being configured to communicate with a storage device;
  a line card including a plurality of ports, at least one of the plurality of ports being configured to communicate with a server;
  a line card including a plurality of ports, at least one of the plurality of ports being configured to communicate with a network switch; and
  a switch card configured to switch data packets and to communicate with each of the line cards through a backplane;
  an application specific integrated circuit configured to:
    determine that an incoming packet requires protocol conversion; and
    send at least a portion of the incoming packet to a network processing unit in response to the determination; and
  the network processing unit configured to:
    receive the data packets from the line card, the data packets comprising an incoming packet;
    identify a first communication protocol of the incoming packet, the incoming packet destined for a destination port associated with a second communication protocol;
    determine if the first communication protocol matches the second communication protocol;
    determine if the first communication protocol and the second communication protocol have a common layer if the first communication protocol does not match the second communication protocol; and
    encapsulate the incoming packet in the second communication protocol if the first communication protocol and the second communication protocol have a common layer.

59. The unified networking device of claim 58, further comprising a line card including a plurality of ports, at least one of the plurality of ports being configured to communicate with a router.

60. The device of claim 58, wherein the network processing unit is further configured to:
  determine if the first communication protocol and the second communication protocol have TCP-like functionality if the first communication protocol and the second communication protocol have a common layer; and
  perform TCP-proxy function if the incoming packet has TCP-like functionality.

61. The device of claim 58, wherein the network processing unit is further configured to:
  determine if the first communication protocol and the second communication protocol have TCP-like functionality if the first communication protocol and the second communication protocol have a common layer, and
  perform block storage conversion if the incoming packet does not have TCP-like functionality.

62. A network system comprising:
  a unified networking device configured to communicate with a storage device, server, a router, and a network switch; and
  a second unified networking device configured to:
    communicate with the storage device, the server, the router, and the network switch, the unified networking device and the second unified networking device further configured to communicate with each other, the second unified networking device comprising:
      an application specific integrated circuit configured to:
        determine that an incoming packet requires protocol conversion; and
        send at least a portion of the incoming packet to a network processing unit in response to the determination; and
      the network processing unit configured to;
        identify a first communication protocol of an incoming packet, the incoming packet destined for a destination port associated with a second communication protocol;
        determine if the first communication protocol matches the second communication protocol;
        determine if the first communication protocol and the second communication protocol have a common layer if the first communication protocol does not match the second communication protocol; and
        encapsulate the incoming packet in the second communication protocol if the first communication protocol and the second communication protocol have a common layer.

63. The network system of claim 62, wherein the unified networking device includes a plurality of line cards each having at least one port capable of transmitting packets, and a switch cards configured to communicate with the plurality of line cards across a backplane.

64. The network system of claim 63, wherein each of the plurality of line cards includes a packet process or in communication with the backplane.

65. The network system of claim 63, wherein the switch card includes at least one flow control application specific integrated circuit (ASIC) and a crossbar switch.

66. The network system of claim 62, wherein the second unified networking device includes a plurality of line cards each having at least one port capable of transmitting packets, and a switch card configured to communicate with the plurality of line cards across a backplane.

* * * * *